(12) United States Patent
Bravmann et al.

(10) Patent No.: US 9,953,381 B1
(45) Date of Patent: Apr. 24, 2018

(54) SYSTEM AND METHOD FOR SHARING INVESTMENT INFORMATION VIA A SOCIAL NETWORK

(71) Applicant: Charles Schwab & Co., Inc., San Francisco, CA (US)

(72) Inventors: Kenneth M. Bravmann, Pleasanton, CA (US); Sandeep Reddy Chelamacherla Anand, Denver, CO (US); Charles E. Gotlieb, San Francisco, CA (US)

(73) Assignee: Charles Schwab & Co., Inc., San Francisco, CA (US)

( * ) Notice: Subject to any disclaimer, the term of this patent is extended or adjusted under 35 U.S.C. 154(b) by 638 days.

(21) Appl. No.: 14/580,122

(22) Filed: Dec. 22, 2014

Related U.S. Application Data (60) Provisional application No. 61/919,811, filed on Dec. 22, 2013.

(51) Int. Cl.
| | |
|---|---|
| *G06F 15/16* | (2006.01) |
| *G06Q 50/00* | (2012.01) |
| *H04L 29/08* | (2006.01) |
| *H04L 12/58* | (2006.01) |
| *G06Q 40/00* | (2012.01) |

(52) U.S. Cl.
CPC ............. *G06Q 50/01* (2013.01); *G06Q 40/00* (2013.01); *H04L 51/32* (2013.01); *H04L 67/10* (2013.01)

(58) Field of Classification Search
CPC .............................. H04L 67/10; H04L 51/32
USPC .......................................................... 709/207
See application file for complete search history.

(56) References Cited

U.S. PATENT DOCUMENTS

| | | | |
|---|---|---|---|
| 6,421,570 B1 * | 7/2002 | McLaughlin | G05B 19/4185 700/2 |
| 2005/0080695 A1 * | 4/2005 | Gatto | G06Q 40/00 705/35 |
| 2007/0174389 A1 * | 7/2007 | Armstrong | G06F 17/30867 709/204 |
| 2008/0126476 A1 * | 5/2008 | Nicholas | G06Q 10/10 709/203 |
| 2008/0183596 A1 * | 7/2008 | Nash | G06F 17/30979 705/26.1 |
| 2011/0276396 A1 * | 11/2011 | Rathod | G06F 17/30867 705/14.49 |
| 2012/0005276 A1 * | 1/2012 | Guo | G06F 17/30902 709/206 |
| 2013/0060859 A1 * | 3/2013 | Olsen | G06Q 30/02 709/204 |
| 2013/0268372 A1 * | 10/2013 | Jalili | G06Q 30/0277 705/14.66 |
| 2014/0047041 A1 * | 2/2014 | O'Sullivan | G06F 17/30867 709/206 |

* cited by examiner

*Primary Examiner* — Karen Tang
(74) *Attorney, Agent, or Firm* — Innovation Partners; Charles E. Gotlieb (57) ABSTRACT

A system and method allows users to share watchlists with other users of a group such as that established on a social network server, and receives and displays other related information.

18 Claims, 4 Drawing Sheets

SYSTEM AND METHOD FOR SHARING INVESTMENT INFORMATION VIA A SOCIAL NETWORK

RELATED APPLICATIONS

This application claims the benefit of U.S. Provisional Patent Application 61/919,811 entitled, Method and Apparatus for Sharing Investment Information Via a Social Network, filed by Kenneth M. Bravmann, Sandeep Reddy Chelamacherla Anand, and Charles E. Gotlieb on Dec. 22, 2013 and is related to U.S. patent application Ser. No. 14/145,872 entitled, "System and Method for Securing Information Provided Via a Social Network Application" filed by Kenneth M. Bravmann, Benjamin N. Mattias, Jeffrey M. Weaver, Sandeep Reddy Chelamacherla Anand, John Murphy and Charles E. Gotlieb on Dec. 31, 2013, which claims the benefit of U.S. Provisional Patent Application Ser. No. 61/748,057 entitled, "Method and Apparatus for Securing Information Provided Via a Social Network Application" filed by Kenneth M. Bravmann, Benjamin N. Mattias, Jeffrey M. Weaver, Sandeep Reddy Chelamacherla Anand, John Murphy and Charles E. Gotlieb on Dec. 31, 2012, each having the same assignee as the present invention and each is hereby incorporated by reference in its entirety.

FIELD OF THE INVENTION

The present invention is related to computer software and more specifically to computer software for sharing.

BACKGROUND OF THE INVENTION

It can be desirable to share securities information with other people.

SUMMARY OF INVENTION

A system and method allows users to set up groups of users on one or more social networks, among which they can share investment information. To allow the user to share information, the user may install and grant permissions to an application in a social network, such as FACEBOOK, and the application may provide the functionality described herein or the system and method may operate without a separate social network.

The user may set up groups on the social network and allow other users to join. The user may log into the social network and run the application at any time. The permissions may include permissions to allow the user to share information about securities with members of groups the user specifies or with members of any group, as long as the user is also a member of the group.

Via the application, the user may then log into an account at a non-social network server, such as a server from which the user may interact with an account at a financial institution, such as SCHWAB.COM. The application associates the user's account at the financial institution with the user's social network account and stores the association for future use. The user need only start the application to make use of the association, after the association has been made.

In one embodiment, a user can maintain at a server of the non-social network one or more lists of securities called 'watchlists' that the user uses to share securities information as described herein. If the user has multiple watchlists, the user may also designate which watchlists will be shared with other users of other groups and such designations are enforced.

The user may then view information about securities according to a viewing mode. Viewing modes may include a mode to allow the user to view information about securities added to a watchlist by only that user, securities added to a watchlist by any user who is a member of any social network group of which the user is also a member and was specified as a group of one or more with which the user granted permission to share securities information, either listed in a single list or segregated by group (in the event the user granted permission to multiple groups).

The user may add securities to, or remove securities from, a watchlist either via the application or via the non-social network server and the changes are stored at the non-social network server. Information about which user has which security on a watchlist is retrieved by the application from the non-social network server and so changes made to a watchlist are visible from the non-social network server (by the user making the change) as well as the application on the social network.

Users in a group may comment on a security, and the comments are received and stored associated with the user and the security. Any member of a group will see all of the securities on the watchlists of all members who granted permission to such group, and will also see the comments from any member of such group. The user may also see an indication of which users have a security on their watchlist, current price and price change information of that security, and other information about each security listed.

The user may change viewing modes and the information about securities is displayed according to the most recent mode selected. The user may also rate other users in the group or groups with which securities information is being shared. The individual securities displayed to a user may be ordered in accordance with the ratings (from the user to whom the securities are displayed or from all users of any group the user to whom the securities are being displayed has granted permission) of people who have that security on their watchlist or have commented on the security, so that users who either have a security on their watch lists or commented and who are rated higher (by the user to whom the securities are displayed or by all such users described above) will cause a security and its comments to be listed earlier on the list of securities than other securities being listed according to the mode the user has selected.

DETAILED DESCRIPTION OF A PREFERRED EMBODIMENT

Figure 1:
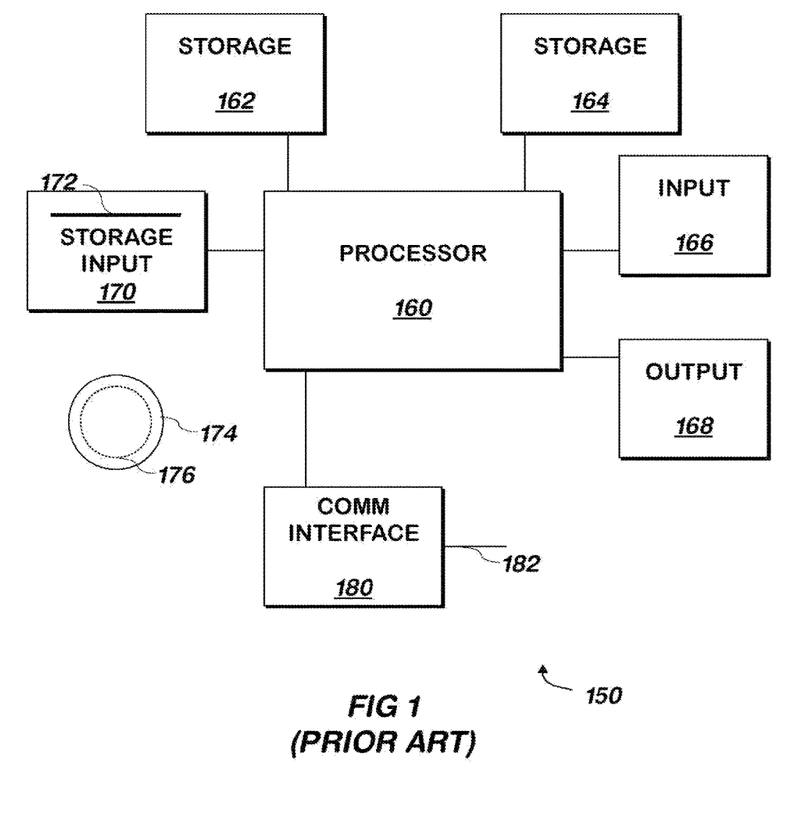
FIG. 1 is a block schematic diagram of a conventional computer system.

The present invention may be implemented as computer software on a conventional computer system, or as hardware processors coupled to digital storage devices, operating as described herein. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. All storage elements described herein include any type of such storage and some or all elements described herein may include a hardware processor. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below. All storage elements listed below may include memory or disk storage and may include a conventional database. System elements may include inputs, outputs, input/outputs and a hardware processor.

In one embodiment, each computer system 150 is a conventional SUN MICROSYSTEMS T SERIES SERVER running the SOLARIS operating system commercially available from ORACLE CORPORATION of Redwood Shores, Calif., a PENTIUM-compatible personal computer system such as are available from DELL COMPUTER CORPORATION of Round Rock, Tex. running a version of the WINDOWS operating system (such as XP, VISTA, or 7) commercially available from MICROSOFT Corporation of Redmond Wash. or a Macintosh computer system running the MACOS or OPENSTEP operating system commercially available from APPLE INCORPORATED of Cupertino, Calif. and the FIREFOX browser commercially available from MOZILLA FOUNDATION of Mountain View, Calif. or INTERNET EXPLORER browser commercially available from MICROSOFT above, although other systems may be used. Each computer system 150 may be a SAMSUNG GALAXY NEXUS III commercially available from SAMSUNG ELECTRONICS GLOBAL of Seoul, Korea running the ANDROID operating system commercially available from GOOGLE, INC. of Mountain View, Calif. Various computer systems may be employed, with the various computer systems communicating with one another via the Internet, a conventional cellular telephone network, an Ethernet network, or all of these.

Social Network Users Install Application, Grant Permission to Social Network to Allow Application to See Group Participants.

Figure 2:
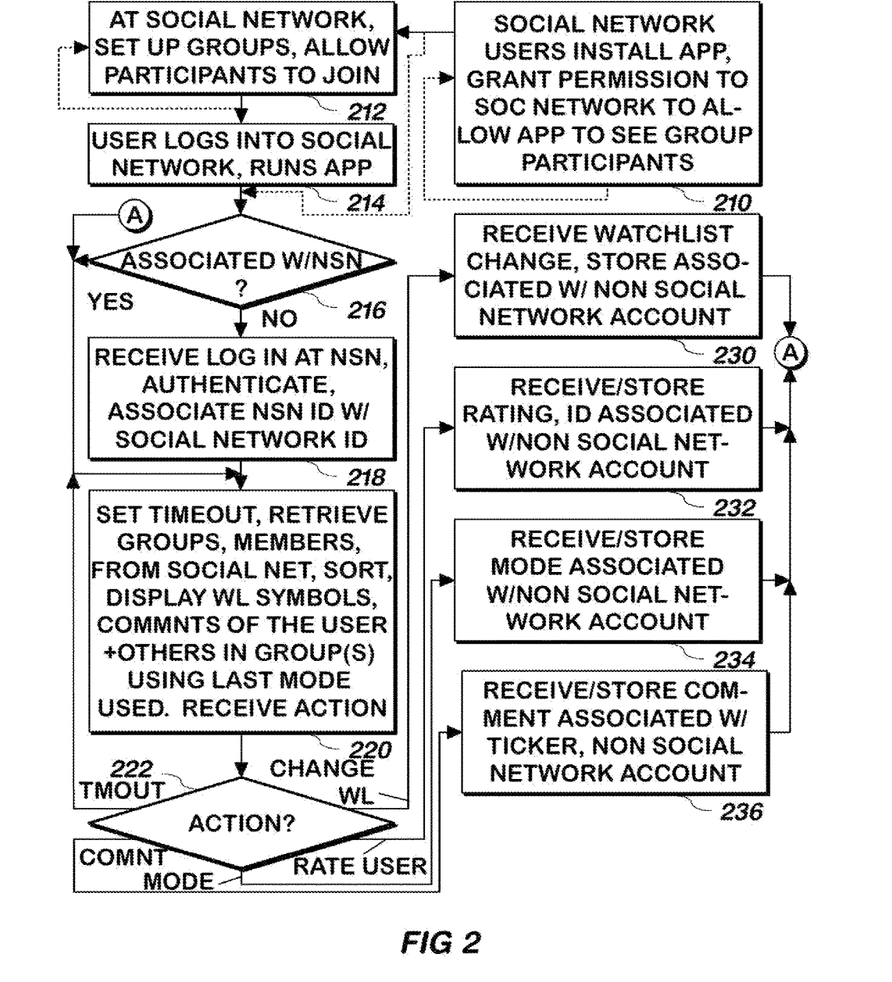
FIG. 2 is a flowchart illustrating a method of displaying securities from multiple sources information according to one embodiment of the present invention.

At any time, a social network application as described herein may be installed by a user ("social network user") having a social network account at a social network, such as any FACEBOOK users or any other social network users, and social network permissions to allow the application to access social network groups information corresponding to the social network user installing the application, including any social network groups of which the user is a member and other social network users that are also members of such groups, may be granted by the user 210. Any number of users may perform step 210. The social network application operates as described herein.

In one embodiment, the user grants permissions on a group by group basis for any group of which the user is a member, so that certain groups are granted permissions, but not all groups need be granted permissions. The user may add or remove permissions for a group at any time.

At Social Network, Set Up Groups, Allow Participants to Join.

At the social network, any number of social network groups may be set up by any number of social network users at any time, and other social network participants or group members may be allowed to join such groups at any time via conventional social network means 212. Steps 210 and 212 may operate as independently operating processes as shown by the dashed lines in the Figure. As used herein, a group is a feature of a social network that allows users to add themselves (optionally via permission of a moderator) or be added to a group and once added, see posts made to that group by other members of a group.

User Logs into Social Network, Runs Application.

After the user has installed the application as part of step 210, or installed the application and also set up and/or joined any social network groups as part of step 212, or at any time subsequent to the steps described above, the user log in information may be received at the social network, and the installed application may be run 214 and operates as described herein. In one embodiment, when the application is run by a social network user, a check may be performed to determine whether the social network account corresponding to the logged in user is associated with a non-social network account, described below.

If not Associated with a Non-Social Network Account, then Receive Log in at Non-Social Network, Authenticate, and Associate Non-Social Network Identifier with Social Network Account Identifier.

If the user's social network account is not associated with a non-social network account 216, then non-social network account log in information is received from the user at the non-social network via the application and authenticated, and when the user's non-social network log in information is authenticated, the user's social network account identifier is associated with a received non-social network account identifier of that user 218. As used herein, a non-social network" is any application or applications running on a conventional network server but not running under a social network or the social network described herein. A non-social network need not be part of a network.

In one embodiment, when non-social network log in information is first received and authenticated at the non-social network as described herein and in the related application, an alternate non-social network account identifier may be issued by the non-social network to link the user's social network account with the user's non-social network account without supplying the actual account identifier of the user at the non-social network. Such alternate identifier may be saved associated with the user's non-social network account at the non-social network and used to identify such account at the non-social network in any further communications with the application as described herein.

In one embodiment, if the user does not provide non-social network account log in information, or if non-social network account log in information provided by the user is not authenticated, such as described in the related application, then no non-social network account identifier is associated with the user's social network account identifier at the application, and, for that user, the method may stop or wait until such non-social network account log in information is received and authenticated.

If Associated with Non-Social Network Account, then Retrieve Groups and Members from Social Network, Sort and Display Watchlist Symbols, Comments of the User, Comments of Others in Group(s) Using Last Mode Used; Receive Action.

If the user's social network account is authenticated or has previously been authenticated with a non-social network account 216, then a timeout period for displaying the user's watchlist is set; social network groups information, including names or other identifiers corresponding to any social network groups of which the user is a member and for whom other users have designated such group or groups as those for which their watchlist information should be shared as described herein, and optionally the user identifiers of other members of such groups, is retrieved; the socially shared watchlist information is displayed in a viewing mode selected by the user as described in more detail below; and one of any number of actions from the user may be received 220. In one embodiment, the timeout period is set as the amount of time between automatic iterations of identifying, sorting, and redisplaying the user's socially shared watchlist as described in more detail below. For example, the timeout period may be set to thirty seconds from the current time, or one minute from the current time, or any other amount of time.

In one embodiment, the user's social network groups information may be retrieved and compared with the social network groups information previously retrieved and stored for the user. Any social network groups of which the user is no longer a member may be removed from the user's stored social network groups information, and any new social network groups joined by the user may be added. The user may provide an indication corresponding to each social network group of whether the user's watchlist information is to be socially shared as described herein with the other members of each group of which the user is a member as described above. Such indications received from the user may be also be stored with the user's social network groups information.

To display the socially shared watchlist information of the user, each of any ticker symbols included in the user's individual shared or non-socially shared watchlist or watchlists, each of which may be a conventional watchlist defined by the user via the user's non-social network, the application, or both, are identified, along with any ticker symbols included in any other individual watchlists defined by other users who are members of the same social network group or groups as the user, and for which such groups were designated by the other users as described herein as ones with whom such watchlists should be shared as part of the permissions received from those users, and all such ticker symbols identified may be sorted as described in more detail below and displayed (in sorted order) according to the last viewing mode indicated by the user (described in more detail herein and below) along with any comments corresponding to such ticker symbols that have been made by the user and/or other members of the user's social network groups.

Any number of actions may be received from the user, such as an action to make a change to the user's watchlist, an action to rate another user who is a member of at least one of the user's social network groups, an action to change the display mode corresponding to the user's socially shared watchlist, an action to comment on a ticker symbol included in the user's socially shared watchlist, and/or any other user action.

If Action Received is Change to Watchlist, Receive Watchlist Change, and Store Associated with Non-Social Network Account.

If the user action received is a request to make a change to the user's individual watchlist 222, such as adding new ticker symbols to such watchlist and/or deleting any ticker symbols currently included from the user's individual watchlist, then such change to the user's watchlist is received, implemented, and stored associated with the user's non-social network account identifier 230. In one embodiment, items (i.e. ticker symbols) may be added to the user's watchlist by manually typing in the ticker abbreviation or symbol that the user wishes to add, or by searching for the ticker symbol, such as by typing in the name of the company or corporation associated with such ticker, or ticker symbols may be suggested to the user that the user may click on to add based on the current contents of the user's individual or group watchlists or based on any other information, or the user may add items to the user's watchlist in any other manner.

To delete items from the user's watchlist, a delete and/or edit button may be displayed to the user corresponding to each of any items included in the user's watchlist that the user may click to delete the associated item from the user's watchlist, or items may be deleted from the user's watchlist in any other manner.

In one embodiment, any changes to the user's individual watchlist that are received at the application via the application may be stored at the user's non-social network associated with the user's non-social network account identifier such that the changes may also be implemented and displayed to the user at the user's non-social network any time the user views his or her watchlist via such non-social network.

If Action Received is to Rate Other User, then Receive Rating and Other User Identifier, and Store Associated with Non-Social Network Account Identifiers.

If the action is received from the user as a request to rate another member of the user's social network group or groups, or to change the rating corresponding to another member if the other member has been previously rated by the user 222, then the user's rating of such other member is received and stored 232 associated with the user's non-social network account identifier and the identifier of such other member. In one embodiment, the user's rating of other members may be received on a rating scale, such as a scale of one to five stars with one star being the poorest rating and five stars being the highest rating, or a scale of zero to ten dollars with ten dollars indicating other members whose opinions the user most values and zero dollars representing other members whose opinions the user does not value, or any number of other rating scales may be used. In one embodiment, the user may provide a rating for any other social network users that are also members of one or more of the user's social network groups and who have designated one such group as one with which their watchlist should be shared; however, the user is not required to rate any other members, and in such a case where the user has not rated another member, such member's rating with respect to the user may be initialized to a not rated rating, or rating in the middle of the rating scale.

In one embodiment, to receive ratings, a new browser window may be popped by the application which includes information from one or more other members' social network profiles, as well as any current ratings of the user associated with such other member(s), and the user may rate the other member(s) displayed, such as by selecting a rating on a rating scale for each other member, or by entering a rating for another member, or in any other manner. Any ratings of other members received from the user may be stored at the application associated with the user's social or non-social network account identifier, as well as the social or non-social network account identifier corresponding to the rated user.

If Action Received is to Set Viewing Mode, then Receive Mode and Store Associated with Non-Social Network Account.

If the action received from the user is to set the viewing mode corresponding to the user's socially shared watchlist information 222, then the viewing mode selected by the user is received and stored associated with the user's social and/or non-social network account 234. In one embodiment, the user may select the viewing mode by clicking a button to alternate among various modes of viewing the user's socially shared watchlist, or by clicking one of any viewing mode icons displayed which each correspond to a different viewing mode, or in any other manner.

Viewing modes corresponding to a user's socially shared watchlist may include any number of modes for displaying the ticker symbols included in the user's individual watchlist, as well as the ticker symbols which may be included in the individual watchlist(s) of any other users who are in one or more of the same social network groups as the user, the members of such groups being group members with whom each such other user has indicated to share watchlist information.

In one embodiment, the user may select one of any number of viewing modes, such as a mode to view only the ticker symbols included in the user's individual watchlist, or to view the ticker symbols included in the user's individual watchlist as well as the ticker symbols corresponding to any other members of any groups with which the user has opted to share watchlist information and whose members have also agreed to share such information with the user. For any viewing mode displaying the ticker symbols included in any other users' watchlists, such socially shared watchlist information may be displayed organized by social network groups, such that ticker symbols are displayed in groupings corresponding to the social network group or groups sharing each ticker symbol, or the socially shared watchlist information may be displayed organized according to the other user or other users that are sharing each ticker symbol, or all ticker symbols from the watchlist socially shared with other members of any groups with whom the user is sharing watchlist information may be displayed in a particular order, for example, alphabetical order, or chronological order with respect to the order in which the items were added to the user's socially shared watchlist, or in no particular order, or the user's socially shared watchlist may be displayed in any other manner. In one embodiment, to display socially shared watchlist information organized by social network groups, the ticker symbols included for more than one of the user's social network groups may appear more than once in the display of the user's socially shared watchlist information.

To display socially shared watchlist information organized by user, ticker symbols may be displayed in one or more groupings which are based on the other social network group member or members through which such ticker symbols are included in the user's socially shared watchlist. In one embodiment, ticker symbols corresponding to other users rated most highly by the user may be displayed before ticker symbols corresponding to other users not rated as highly by the user, as described in more detail below with respect to FIG. 3, or such ticker symbols may be displayed for each user, with the users listed in order of their rating supplied by that user, or ticker symbols organized and displayed by user may be ordered in any other manner, such as alphabetically, by the first name of the other user adding such ticker symbol to the socially shared watchlist, or in any other manner.

In one embodiment, the user's socially shared watchlist will next be displayed using the most recent viewing mode selected by the user (and stored corresponding to the user) until the user selects a different viewing mode. If no such mode is selected, a default mode is assigned.

Comments from other users or from other users in a group (for a mode in which watchlists are segregated by group) are displayed with the ticker symbol as described in more detail below. In one embodiment, comments made by the user and/or comments made by other users that are members of one or more of the user's social network groups are displayed in chronological order, associated with both the ticker symbol for which such comment was made and the user that made it.

If Action Received is to Comment on Ticker Symbol, then Receive Comment and Store Associated with Ticker and Non-Social Network Account.

If the user action is a received comment corresponding to a ticker symbol in the user's socially shared watchlist 222, then such comment is received at the application, along with the ticker symbol for which such comment applies, and the received comment is stored associated with the ticker symbol for which the comment was made and the social and/or non-social network account identifier of the commenting user 236. Such comments are displayed as described herein.

Following steps 230-236, the method continues at step 220 using newly updated information received in any such step as well as information from other users as described herein, which may be updated by such other users in a similar fashion.

If Timeout.

If the end of the timeout period is reached 222, then the method continues at step 220, which includes setting a new timeout period.

In one embodiment, a user may have multiple watchlists, and the user may share some, all or none of them with a group of which the user is a member. In one embodiment, one watch list of the user may be shared with one such group and a different watchlist may be shared with a different group.

Figure 3:
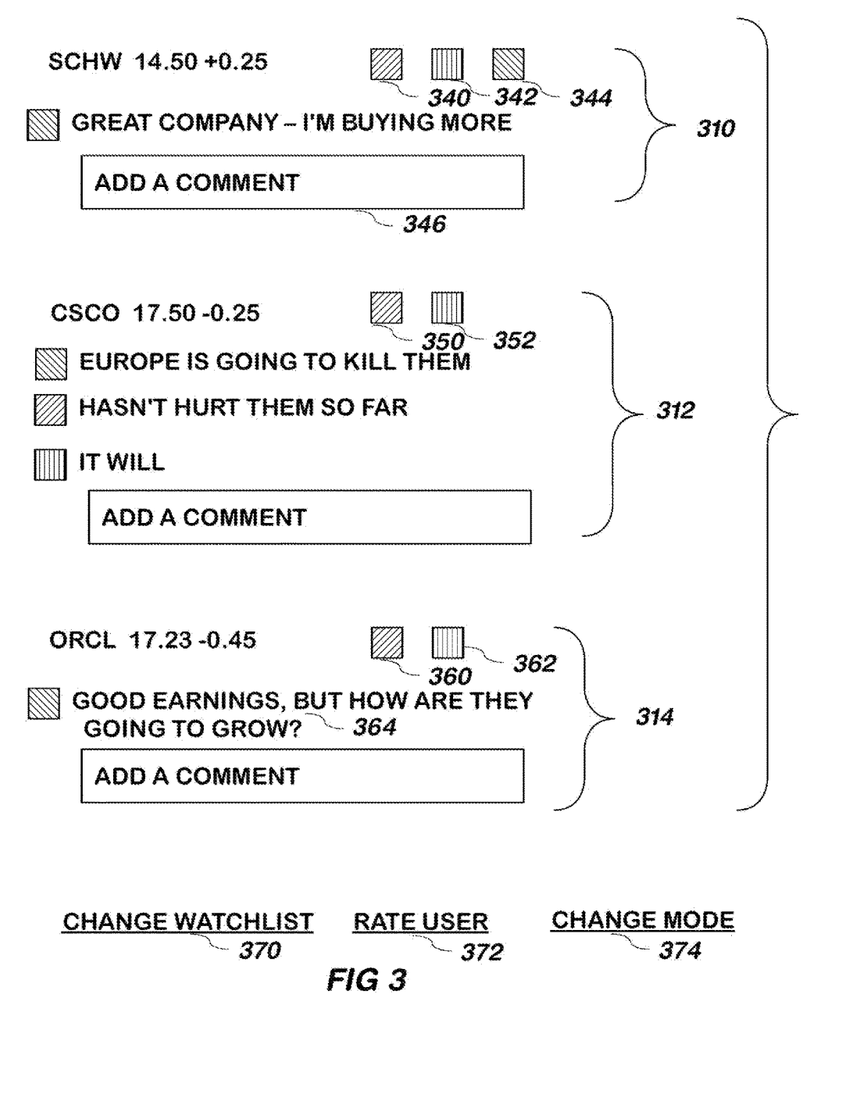
FIG. 3 is a representative screen display of the application according to one embodiment of the present invention.

FIG. 3 is an exemplary screen shot of shared watchlists provided by the method and system of the present invention according to one embodiment of the present invention.

The socially shared watchlist 300 of FIG. 3 includes three items or ticker symbol blocks 310, 312, and 314, each ticker symbol block identified by a ticker symbol: block 310 is identified by the ticker symbol SCHW 320 (corresponding to shares of stock in CHARLES SCHWAB), along with the current price per share, or the last day's closing price per share, of such stock 322, displayed at as 14.50 (US dollars per share), and the price of such stock with respect to the previous day's closing price of such stock 324, displayed in FIG. 3 as +0.25.

Social network profile pictures 326, 328, and 300 corresponding to each social network group member that has included SCHW in his or her individual watchlist that is shared with the group, are displayed to the right of such ticker symbol and its corresponding price per share and price relative to the prior close information, and any comments 364 with respect to such ticker symbol made by the user or any other member or members of the social network groups socially sharing such ticker symbol via their watchlists are displayed, along with the social network profile picture of the user making such comment 340, such as below the ticker symbol 320 by which such ticker symbol block 310 is identified. Additionally, suitable user interface elements 346 to allow the user to add a comment corresponding to such ticker symbol is also displayed.

As mentioned above with respect to FIG. 2, ticker symbols included in socially shared watchlist information for a user may be sorted and displayed according to any number of factors and the viewing mode selected by the user. As displayed in the exemplary screen shot of FIG. 3, ticker symbol blocks, 310, 312, and 314 may be sorted and displayed for a user viewing socially shared watchlist information according to the rating corresponding to each ticker symbol in such socially shared watchlist, factors of such ticker symbol ratings including the number of other users sharing each ticker symbol from his or her individual watchlist and the other user rating, as received from the viewing user if the viewing user has provided such a rating, with respect to such other users sharing such ticker symbol from his or her individual watchlist.

Ticker symbol blocks 310 and 312 may be rated higher than, and displayed sorted before, ticker symbol block 314 because the number of other social network group members who have added to their watch lists the ticker symbol corresponding to such blocks (three other users sharing SCHW, as shown by profile pictures 340, 342, and 344; and three other users sharing CSCO, as shown by profile pictures 350, 352, and 354) is greater than the number of other social network group members sharing ORCL (360 and 362 of block 314). Of the two more highly rated ticker symbols in terms of the number of other social network group members sharing such ticker symbol, two of the profile pictures displayed for SCHW, 326 and 328 of block 310, are also displayed for CSCO, 350 and 352 of block 312. In such a case, SCHW 310 may be displayed before CSCO 312 if the other social network group member corresponding to profile picture 330 has been rated more highly by the viewing user than the other social network group member corresponding to profile picture 352. The number of comments and ratings of users making comments may also impact the sorting order, with more comments moving the information for a ticker symbol higher in the ratings than fewer, and the higher rated users comments impacting the sort order more than lower rated users. In one embodiment, if a user has recently added a symbol to a watchlist or adds a comment, the sort order of the information for the corresponding ticker symbol will be higher than one for which no recent add or comment is made, with higher rated users recent adds or comments having a greater impact on the sort order than other user's comments or adds to their watchlists. In one embodiment, ticker symbol blocks 310-314 with more recent comments may be sorted higher than ticker symbol blocks 310-314 with older comments.

A combination of these factors may be used to sort the ticker symbol blocks 310-314. Thus, a recent comment from a highly rated user may cause a ticker symbol block 310-314 corresponding to the comment to be sorted first, but a recent comment from a lower rated user may cause the ticker symbol block 310-314 corresponding to the comment to be moved higher in the sorted order than it would have been otherwise, but not necessarily moved to the top. When sorting ticker symbol blocks 310-314, only the ratings of the user to which the blocks 310-314 are being displayed may be used, or the ratings from all users may be used, with the user to which the blocks 310-314 are being displayed weighted more than other users, and the ratings of higher rated users weighted less than such user, but more than that of other lower rated users when identifying the sorted order for the ticker symbol blocks 310-314. Because different users will have rated other users differently, this can cause one user in a group to see ticker symbol blocks in a different order than other users in the group. Furthermore, the sorted order of the ticker symbol blocks 310-314 may change for a user because another user rated a different user differently or added a comment. In one embodiment, a chronological order is used to display the comments 364 within a ticker symbol block 310-314, with older comments optionally being hidden based on their age, but with a user interface element allowing such older comments to be viewed.

The ticker symbol blocks 310, 312 and 314 may be periodically or occasionally resorted and redisplayed in the new sorted order, such as when the sort order would change due to a new comment or a user adding or removing a ticker symbol.

As mentioned above, a user may provide ratings information, or update ratings information, corresponding to any number of other members of any of the user's social network groups with which the user is reciprocally sharing social watchlist information at any time, such as by clicking the "rate user" button or link shown in the Figure as element 372, which, when clicked, provide a user interface allowing the user to rate another user.

Ratings used for the sorting may be based on the ratings of the user viewing the information or the ratings of all users in any group for which the viewing user has granted permission to share social network information and who have also granted permission to any such group. In one embodiment, the ratings of the user are weighted higher than ratings of other users, while other users ratings for a third user may be ranked higher based on the user's rating of that other user.

The viewing user may change the viewing mode corresponding to his or her socially shared watchlist, as described above, by clicking a displayed change mode link 374. A change watchlist link 370 may also be displayed to allow the user to change the ticker symbols included in the user's individual watch list, as described above.

In one embodiment, any member of the group can comment on a security, even if they did not supply the security on their list.

In one embodiment, users who are not members of a group cannot see the list of securities or comments that are shown to the members of the group nor provide comments or rate in a manner that would affect the display of users of the group.

In one embodiment, persons in a group are fewer than all of the users of the social network server, and are defined to the social network server as described herein.

System.

Figure 4:
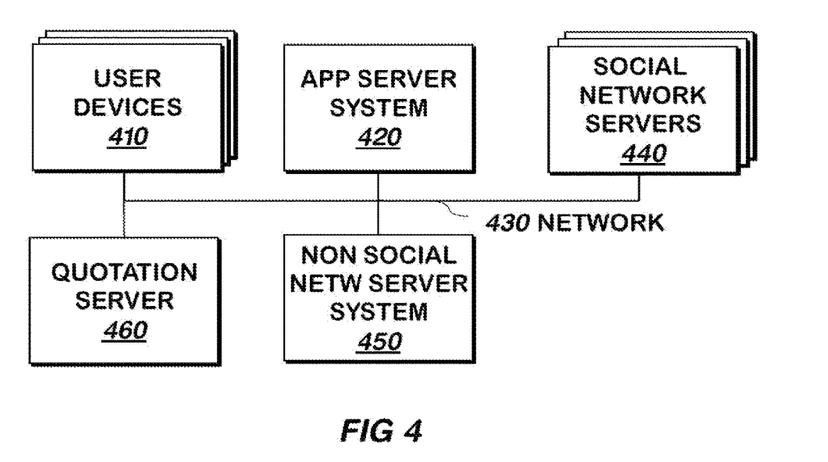
FIG. 4 is a block schematic diagram of a system for displaying securities information from multiple sources according to one embodiment of the present invention.

FIG. 4 is a block schematic diagram of a system for sharing watchlist information using social network groups according to one embodiment of the present invention.

In one embodiment, the system of FIG. 4 contains any number of user devices 410, application server system 420, any number of social network servers 440, and non-social network server 450, each of which may include conventional server systems including hardware processors and digital storage such as disk or memory, with at least systems 440 and 450 optimized for high transaction volumes and including a conventional database, though other arrangements may be used. All systems 410, 420, 440, and 450 operate as described herein and communicate via network 430, which may include a conventional Ethernet network, the Internet, or both.

Figure 5:
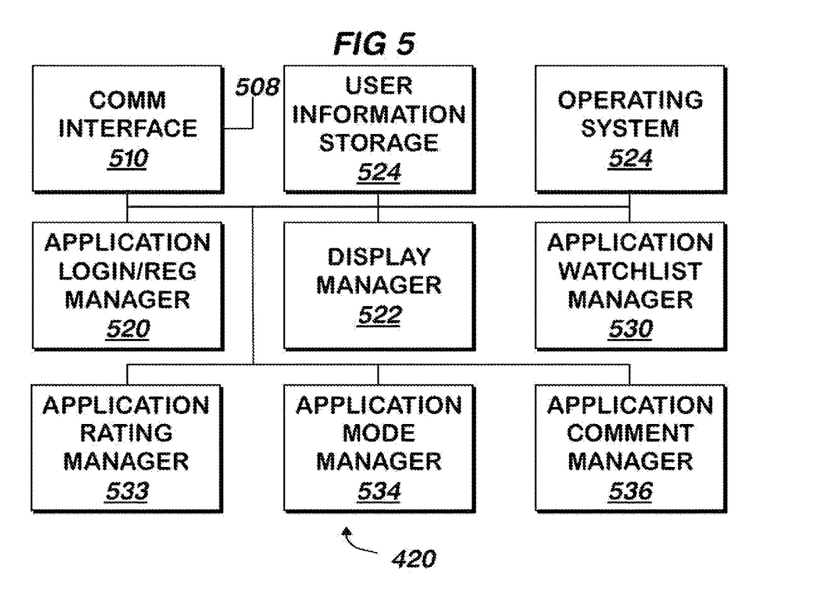
FIG. 5 is a block schematic diagram of an application server system according to one embodiment of the present invention.

FIG. 5 is a block schematic diagram of a representative application server system 410 of FIG. 4 shown in more detail according to one embodiment of the present invention.

Referring now to FIGS. 4 and 5, application server system 420 includes a communication interface 510 which may include a conventional communication interface running suitable communication protocols, such as Ethernet, TCP/IP, or both. In one embodiment, unless otherwise noted herein, all communication in and out of application server system 420 are made via its input/output 508 of its communication interface.

Using user system 410, which may include a conventional personal computer system or smartphone or tablet computer with a conventional browser coupled to the Internet using suitable communication techniques, a user such as the social network user described above may install a social network application associated with the user's social network account on social network server 440, for example, the user's FACEBOOK account on FACEBOOK's server system. In one embodiment, the user may click a link to install the application, such link specifying the application to install, and social network server 410 may receive such indication from the user, including the application identifier, consider the application installed, and send the user's social network account identifier and the application identifier to application log in/registration manager 520.

Application log in/registration manager 520 receives the social network account identifier and installs the requested application, such as by storing the received social network account identifier in user information storage 524 associated with the application identifier.

Social network server 440 may also, at any time, allow social network users to create and/or set up social network groups in a conventional manner as described above, for example, a conventional FACEBOOK group, and also allows social network users to become members of such social network groups using conventional techniques. A group is an association of users that users may opt into our out of on their own or with permission of a moderator. In one embodiment, a user may create and/or set up a social network group using social network server 440, which creates and internally stores a unique group identifier corresponding to the social network account identifier corresponding to the social network user who has set up such group, along with any other settings corresponding to the group, such as any administrative privileges or any settings which define the other users that may or may not join and/or view such group on the social network. For any social network users joining a social network group which as been so created and set up, social network server 440 may store the social network account identifier of the user joining the group in association with the group identifier corresponding to the group.

In one embodiment, a user who is or joins (i.e. becoming a member of) a social network group may provide an indication as to whether or not the user wishes to share his or her watchlist information with other members of that social network group via a user interface provided by display manager 522. In one embodiment, display manager 522 repeatedly queries social network servers 440 to identify groups each user who has installed the application is a member of and the first time it receives such information and at any time it receives information that a user has joined a group, it prompts the user to identify with which groups the user would like to share his or her watch list. A specially designated watch list on non-social network server system 450 may be used for such sharing purposes as described herein. If the user provides such an indication, display manager 522 receives it and stores into user information storage 524 the indication associated with the user's social network account identifier and the group identifier.

When the social network user installs the application, application log in/registration manager 520 may cause social network server 440 to request, and/or the user may grant, social network permissions to allow the application to access social network user name and groups information corresponding to the user's social network account, including any social network groups of which the user is a member as well as the other social network users that are also members of such group(s), as described above.

The user may grant such social network permissions, such as by pressing or clicking an agreement link or button displayed by application log in/registration manager 520 and social network server 440. If the user grants the social network permissions, social network server 440 internally stores such permission in memory or disk storage. At any time subsequent to when the permissions are granted social network server manager 440 may provide the user's social network groups information, described above, or provide access to such information, when requested, in the manner described above and below.

Once the user has successfully installed the application and granted any social network permissions corresponding to the application, social network server 440 may run the application in a conventional manner. Additionally, at any time subsequent to the first time, the social network user may log in to his or her social network account on social network server 440 and provide an indication to run the installed application, such as by clicking a link or button to do so, and social network server 440 complies.

To run the application, social network server 440 may send the user's social network account identifier to application log in/registration manager 520, which receives the social network account identifier and determines whether the received social network account identifier is associated with one or more non-social network account identifiers in user information storage 524.

If the social network account identifier received is not associated with a non-social network account identifier in user information storage 524 (such as is the case the first time that the user runs the application), application log in/registration manager 520 may cause the user's browser on user system 410 to pop a new secure window, such as via conventional HTTPS communication techniques, including suitable user interface elements to allow the user to provide non-social network log in information, such as the user's non-social network username and password, and return it to the user's browser in response. The user may provide such information which application log in/registration manager 520 receives and authenticates to non-social network server system 450 as described above. Non-social network server system 450 compares the information to that which it internally stores in memory or disk storage. In one embodiment, if application log in/registration manager 520 does not authenticate the user's non-social network log in information, or if application log in/registration manager 520 does not receive any non-social network log in information, then application log in/registration manager 520 does not associate the user's social network account identifier with any non-social network account identifier, as described in more detail above and below, and application log in/registration manager 520 may halt the application and/or wait until such non-social network log in information is received and authenticated.

If application log in/registration manager 520 authenticates the user's non-social network log in information, then application log in/registration manager 520 associates the user's social network account identifier with a non-social network account identifier corresponding to the non-social network log in information that was received and authenticated by storing such non-social network account identifier in user information storage 524 associated with the social network account identifier. In one embodiment, such non-social network account identifier may be an opaque or disguised account identifier corresponding to the user's non-social network account, as described above.

When application log in/registration manager 520 has associated the user's social network account identifier with a non-social network account identifier in user information storage 524, as well as if at any subsequent time application log in/registration manager 520 determines that the received social network account identifier is or has been associated with a non-social network account identifier in user information storage 524, application log in/registration manager 520 signals display manager 522 to display the user's socially shared watchlist. In one embodiment, application log in/registration manager 520 may signal display manager 522 with the user's non-social network account identifier, or with the user's social network account identifier, or both, and display manager 522 receives the signal and identifier. In another embodiment, application log in/registration manager 520 signals display manager 522 and stores a conventional cookie, including the user's social and/or non-social network identifier, on the user's user system 410, and signal display manager 522 receives such signal and identifies the user using conventional cookie techniques.

When signaled, display manager 522 receives or identifies the user's social (and/or non-social) network account identifier; sets a timeout period corresponding to the received identifier, as described above; retrieves social network groups information corresponding to the social network account identifier from social network server 440 including user identifiers of each user in each group that includes the user as described above; identifies by retrieving from user information storage 524 the viewing mode associated with the non-social network account identifier (which may be a default mode if the user hasn't selected one); retrieves from non-social network server system 450 the security identifiers (e.g. stock symbols) in the watch lists of each user of the group of which the user is a member who has agreed to share his watch list with that group and who has a user identifier on the non-social network server system 450 that is associated in user information storage 524 with a user identifier on a social network server 440 as well as the watch list of the user (if not so shared), sorts items in the user's socially shared watchlist (as described with respect to FIG. 3); and displays the socially shared watchlist for the user according to the viewing mode identified, including any ticker symbols with their corresponding ticker symbol information and any associated comments with profile pictures, as described in more detail above and below. Display manager 552 retrieves such information from user information storage 524 and from social network servers 440 and non-social network server system 450 to provide such sorted display. In one embodiment, comments and other information stored into user information storage 524 as described herein are stored with the date and time of the comment or other information. In one embodiment, display manager 552 retrieves current price information and price change information from quotation server 460 and displays it as described above.

In one embodiment, to set the timeout period, display manager 522 may signal operating system 524 with a timeout period, such as one minute or thirty seconds, as described above. Operating system 524 receives the timeout period, sets a timer accordingly, and notifies display manager 522 whenever the timeout period has ended.

When display manager 522 has set the timeout period displays the user's socially shared watchlist in the manner described herein, display manager 522 also displays suitable user interface elements, such as one or more links, to allow the user to indicate any number of actions, including making changes to the user's individual watchlist, rating other users that are also members of one or more of the user's social network group or groups, changing the viewing mode corresponding to the user's socially shared watchlist, commenting on items included in the user's social watchlist (i.e. those of the user and others who have agreed to share their watchlist or watchlists to members of groups of which the user is a member), and/or any other actions, as described above.

If the user requests to make changes to the user's individual watchlist, such as a by clicking the link to change the user's watchlist, provided by display manager 522, application watchlist manager 530 receives a request from such click, and provides suitable user elements to allow the user to change any ticker symbols included in his or her watchlist, for example, by displaying an add item button corresponding to any ticker symbols displayed with the user's socially shared watchlist that is not already included in the user's individual watchlist, and/or displaying a text field to allow the user to provide one or more ticker symbols, or company names corresponding to ticker symbols, to add to, or delete from, the user's individual watchlist, and/or by displaying a delete button corresponding to any ticker symbols currently included in the user's individual watchlist that the user wishes to remove.

If the user indicates to make a change to the watchlist, such as by clicking any of the change watchlist buttons or links displayed by application watchlist manager 530, then application watchlist manager 530 receives such indication from the user, including the indication and the ticker symbol corresponding to the indication, and application watchlist manager 530 sends the non-social network user identifier corresponding to such user to non-social network server 450 along with the received ticker symbol and a signal to add or delete such ticker symbol as indicated by the user. The user may log into non-social network server system 450 to maintain their watch list on such server system in a conventional fashion. Social network servers 440 may be the same as or distinct from non-social network server system 450. In one embodiment, application watchlist manager 530 may identify the user's non-social network identifier using conventional cookie techniques, as described above, or application watchlist manager 530 may identify a social network identifier using such cookie techniques and then identify the non-social network identifier corresponding to such social network identifier in user information storage 524.

When application watchlist manager 530 has so signaled non-social network server 450, application watchlist manager 530 signals display manager 522 with the social or non-social network account identifier to redisplay watchlist information, and display manager 522 receives the signal and complies.

If the user requests to rate other social network users that are also members of one or more of the user's social network groups, such as by clicking the link to do so as described above, application rating manager 532 receives a request from the click and provides suitable user interface elements, such as via a new browser window, to allow the user to provide the ratings information corresponding to other members of the user's social network group or groups as described above. In one embodiment, application rating manager 532 may display, such as in a list, a profile picture and/or social network user identifier corresponding to each other user who is sharing their watchlist with the user and for which the user may provide ratings information, along with the user interface elements to allow the user to rate such other users, which may include a rating scale that the user may click to provide the desired rating, and return the rating to the user's browser in response. The user provides such ratings information as desired, application rating manager 532 receives it, and application rating manager 532 stores such received ratings information, including the received rating and the social network user identifier corresponding to the other user that is being rated, in user information storage 524 associated with the user identifier of the viewing user that has provided such ratings information.

If the user requests to change the viewing mode corresponding to the socially shared watchlist for such user as described above, application mode manager 534 receives the click, and application mode manager 534 may provide and display one or more buttons or links corresponding to various viewing options that the user may select, as described above. If the user presses any of such links or buttons displayed, application mode manager 534 receives the viewing mode selected by the user, such as via the link clicked, stores the received viewing mode selection in user information storage 524 associated with the user's social and/or non-social network account identifiers, and signals display manager 522, along with the user's social or non-social network account identifier, to redisplay watchlist information corresponding to such identifiers, and display manager 522 complies.

If the user submits a comment with respect to any of the ticker symbols included in the socially shared watchlist, such as by entering a comment in a text field provided by display manager 522 and pressing a submit comment link or button also provided by display manager 522, application watchlist manager 530 receives such comment submitted by the user and stores such received comment in user information storage 524 associated with the ticker symbol for which such comment was received, the date and time, and the social and/or non-social network account identifier corresponding to the user who has made the comment, as described above. Application comment manager 536 may signal display manager 522, along with the identifier(s), to redisplay watchlist information corresponding to such identifier or identifiers, as described above.

When display manager 522 receives a signal and social and/or non-social network identifier from any of elements 530, 532, 534, or 536, it sets a new timeout period by signaling operating system 524 in the manner described above, and initiates a new iteration of retrieving and checking social network groups information from non-social network server 450, and sorting and displaying the socially shared watchlist corresponding to the received identifier in the manner described above. In one embodiment, the user may indicate one of any number of actions at any number of times, and display manager 522 may redisplay the socially shared watchlist any number of times.

In one embodiment, display manager 522 may also redisplay socially shared watchlist information in the manner described herein if display manager 522 receives a signal from operating system 524 that the end of the current timeout period has been reached. When display manager 522 receives such a signal from operating system 524, display manager 522 signals operating system 524 with a new timeout period, which operating system 524 receives, and display manager 522 redisplays the socially shared watchlist information as described herein.

Summary.

There is shown a method of displaying securities information including receiving from a first server including a social network server a user identifier of each user on the first server in at least one group defined to the first server, each of the at least one group including two or more users interested in sharing securities information with one another; receiving from each of the plurality of users in each of the at least one group a user identifier of said user at a second server; for each of at least some of the plurality of users in the at least one group, associating the user identifier of said user on the first server with the user identifier of said user on the second server; receiving from the second server including a hardware processor, from each of two or more at least some of the plurality of users in the at least one group, a list of securities in which said user is interested; providing for display to each of at least some of the plurality of the users in the at least one group, two or more symbols corresponding to two or more securities from the lists of each of the at least some of the plurality of users of the at least one group that includes such user, responsive to the plurality of lists of securities and the plurality of user identifiers on the first server of the at least one group; receiving from each of at least some of the plurality of the at least one group, at least one comment about at least one of the securities corresponding to the plurality of symbols displayed; and providing for display to each of the plurality of users in the at least one group to which the plurality of symbols are displayed, the at least one comment associated with the symbol of the security about which the at least one comment is directed, and a price of the security corresponding to the symbol.

The method may additionally include receiving from each of two or more the users of the at least one group, at least one rating of each of at least some of the other users of the at least one group having such user and such other user in common; and may include an optional feature whereby the symbols are displayed in an order responsive to at least some of each of the at least one rating of the plurality of users from whom comments regarding the security corresponding to the symbol were received.

The method may include an optional feature whereby the ratings to which the order is responsive are influenced at least more heavily by ratings received from the user for which the symbols and comments are being provided for display than other users from which comments may have been received.

The method may include an optional feature whereby the at least one group comprises two or more groups, and the symbols, prices and comments are displayed responsive to each of the groups in the plurality of groups.

The method may include an optional feature whereby each of the plurality of symbols are displayed responsive to a number of users in at least one of the at least one group from which the security corresponding to said symbol were received.

The method may include an optional feature whereby each of the plurality of symbols are displayed responsive to a number of users in at least one of the at least one group from which comments about the security corresponding to said symbol were received on said user's list.

There is shown a system for displaying securities information including: a log in registration manager having an input coupled for receiving from a first server including a social network server a user identifier of each user on the first server in at least one group defined to the first sever, each of the at least one group including two or more users interested in sharing securities information with one another, and for receiving from each of the plurality of users a user identifier of said user on a second server, the log in registration manager for providing at an output the user identifiers of each of the plurality of users in each of the at least one group received at the log in registration manager input associated with the user identifier of said user at the non-social network server; the second server having an input for receiving from each of two or more at least some of the plurality of users in the at least one group, a list of securities in which said user is interested, associated with the user identifier of said user on the second server, the second server for providing at an output the list of securities in which each said user is interested; a display manager having an input coupled to the second server for receiving the list of securities in which each of at least some of the plurality of users in the at least one group are interested, and to the log in registration manager for receiving the user identifiers of each of the plurality of users in each of the at least one group associated with the user identifier of said user at the non-social network server, the display manager for providing at an output for display to each of at least some of the plurality of the users in the at least one group, two or more symbols corresponding to two or more securities from the lists of each of the at least some of the plurality of users of the at least one group that includes such user, responsive to the plurality of lists of securities and the plurality of user identifiers of the at least one group; and an application comment manager having an input for receiving from each of at least some of plurality of members of the at least one group, at least one comment about at least one of the securities corresponding to the plurality of symbols displayed by the display manager, the application comment manager for providing at an output said at least one comment and an identifier of the securities corresponding to the comment; and whereby:

the display manager input is additionally coupled to the application comment manager output for receiving the at least one comment and the identifier of the security corresponding to the at least one comment; and the display manager is additionally for providing at the display manager output for display to each of the plurality of users in the at least one group to which it displays the plurality of symbols, each of the at least of the comment, associated with the symbol about which the comment is directed and a price of the security corresponding to the symbol received at the display manager input.

The system may additionally include an application rating manager having an input for receiving from each of two or more the users of the at least one group, at least one rating of each of at least some of the other users of the at least one group having such user and such other user in common, the application rating manager for providing each of the at least one rating at an output; and may include an optional feature whereby: the display manager input is additionally coupled to the application rating manager output for receiving each of the at least one rating; and the display manager displays the symbols in an order responsive to at least some of the at least one rating of the plurality of users from whom comments regarding the security corresponding to the symbol were received.

The system may include an optional feature whereby: the application rating manager additionally provides at the output, and the display manager input is additionally for receiving, an identifier of the user from which each rating was received; and the ratings to which the order is responsive are influenced at least more heavily by ratings received from the user for which the symbols and comments are being provided for display by display manager than other users from which comments may have been received.

The system may include an optional feature whereby the at least one group comprises two or more groups, and the symbols, prices and comments are displayed by the display manager responsive to each of the groups in the plurality of groups.

The system may include an optional feature whereby each of the plurality of symbols are displayed by display manager responsive to a number of users in at least one of the at least one group from which the security corresponding to said symbol were received on each said user's list.

The system may include an optional feature whereby each of the plurality of symbols are displayed by the display manager responsive to a number of users in at least one of the at least one group from which comments about the security corresponding to said symbol were received.

There is shown a computer program product including a computer useable medium having computer readable program code embodied therein for displaying securities information the computer program product including computer readable program code devices configured to cause a computer system to: receive from a first server including a social network server a user identifier of each user on the first server in at least one group defined to the first server, each of the at least one group including two or more users interested in sharing securities information with one another; receive from each of the plurality of users in each of the at least one group a user identifier of said user at a second server; for each of at least some of the plurality of users in the at least one group, associate the user identifier of said user on the first server with the user identifier of said user on the second server; receive from the second server including a hardware processor, from each of two or more at least some of the plurality of users in the at least one group, a list of securities in which said user is interested; provide for display to each of at least some of the plurality of the users in the at least one group, two or more symbols corresponding to two or more securities from the lists of each of the at least some of the plurality of users of the at least one group that includes such user, responsive to the plurality of lists of securities and the plurality of user identifiers on the first server of the at least one group; receive from each of at least some of the plurality of the at least one group, at least one comment about at least one of the securities corresponding to the plurality of symbols displayed; and provide for display to each of the plurality of users in the at least one group to which the plurality of symbols are displayed, the at least one comment associated with the symbol of the security about which the at least one comment is directed, and a price of the security corresponding to the symbol.

The computer program product may additionally including computer readable program code devices configured to cause the computer system to receive from each of two or more the users of the at least one group, at least one rating of each of at least some of the other users of the at least one group having such user and such other user in common; and may include an optional feature whereby the symbols are displayed in an order responsive to at least some of each of the at least one rating of the plurality of users from whom comments regarding the security corresponding to the symbol were received.

The computer program product may include an optional feature whereby the ratings to which the order is responsive are influenced at least more heavily by ratings received from the user for which the symbols and comments are being provided for display than other users from which comments may have been received.

The computer program product may include an optional feature whereby the at least one group comprises two or more groups, and the symbols, prices and comments are displayed responsive to each of the groups in the plurality of groups.

The computer program product may include an optional feature whereby each of the plurality of symbols are displayed responsive to a number of users in at least one of the at least one group from which the security corresponding to said symbol were received.

The computer program product may include an optional feature whereby each of the plurality of symbols are displayed responsive to a number of users in at least one of the at least one group from which comments about the security corresponding to said symbol were received on said user's list.

What is claimed is:

1. A method of displaying securities information comprising:
   receiving from a first server comprising a social network server a user identifier of each user on the first server in at least one group defined to the first server, each of the at least one group comprising a plurality of users interested in sharing securities information with one another;
   receiving from each of the plurality of users in each of the at least one group a user identifier of said user at a second server;
   for each of at least some of the plurality of users in the at least one group, associating the user identifier of said user on the first server with the user identifier of said user on the second server;
   receiving from the second server comprising a hardware processor, from each of a plurality of at least some of the plurality of users in the at least one group, a list of securities in which said user is interested;
   receiving from each of a plurality of the users of the at least one group, at least one rating value from a range of possible rating values of each of at least some of the other users of the at least one group having such user and such other user in common;
   providing for display to each of at least some of the plurality of the users in the at least one group, a plurality of symbols corresponding to a plurality of securities from the lists of each of the at least some of the plurality of users of the at least one group that includes such user, responsive to the plurality of lists of securities and the plurality of user identifiers on the first server of the at least one group;
   receiving from each of at least some of the plurality of the at least one group, at least one comment about at least one of the securities corresponding to the plurality of symbols displayed; and
   providing for display to each of the plurality of users in the at least one group to which the plurality of symbols are displayed, the at least one comment associated with the symbol of the security about which the at least one comment is directed, and a price of the security corresponding to the symbol; and
   wherein the symbols are displayed in an order responsive to at least some of each of the at least one rating value given to the plurality of users from whom comments regarding the security corresponding to the symbol were received.

2. The method of claim 1, wherein each of the rating values in the range assigned to at least one other user received from a user indicates a degree of value the opinions of said other user provide to said user.

3. The method of claim 1, wherein the rating values to which the order is responsive are influenced at least more heavily by rating values received from the user for which the symbols and comments are being provided for display than other users from which comments may have been received.

4. The method of claim 1 wherein the at least one group comprises a plurality of groups, and the symbols, prices and comments are displayed responsive to each of the groups in the plurality of groups.

5. The method of claim 1, wherein each of the plurality of symbols are displayed responsive to a number of users in at least one of the at least one group from which the security corresponding to said symbol were received.

6. The method of claim 1, wherein each of the plurality of symbols are displayed responsive to a number of users in at least one of the at least one group from which comments about the security corresponding to said symbol were received on said user's list.

7. A system for displaying securities information comprising:
   a log in registration manager having an input coupled for receiving from a first server comprising a social network server a user identifier of each user on the first server in at least one group defined to the first sever, each of the at least one group comprising a plurality of users interested in sharing securities information with one another, and for receiving from each of the plurality of users a user identifier of said user on a second server, the log in registration manager for providing at an output the user identifiers of each of the plurality of users in each of the at least one group received at the log in registration manager input, associated with the user identifier of said user at the non-social network server;
   the second server having an input for receiving from each of a plurality of at least some of the plurality of users in the at least one group, a list of securities in which said user is interested, associated with the user identifier of said user on the second server, the second server for providing at an output the list of securities in which each said user is interested;

an application rating manager having an input for receiving from each of a plurality of the users of the at least one group, at least one rating value from a range of possible rating values of each of at least some of the other users of the at least one group having such user and such other user in common, the application rating manager for providing each of the at least one rating value at an output;

a display manager having an input coupled to the second server for receiving the list of securities in which each of the at least some of the plurality of users in the at least one group are interested, and to the log in registration manager for receiving the user identifiers of each of the plurality of users in each of the at least one group, associated with the user identifier at the non-social network server of each said user in each of the at least one group, and to the application rating manager output for receiving each of the at least one rating value, the display manager for providing at an output for display to each of at least some of the plurality of the users in the at least one group, a plurality of symbols corresponding to a plurality of securities from the lists of each of the at least some of the plurality of users of the at least one group that includes such user, responsive to the plurality of lists of securities and the plurality of user identifiers of the at least one group, and in an order responsive to at least some of the at least one value rating given to the plurality of users from whom comments regarding the security corresponding to the symbol were received; and an application comment manager having an input for receiving from each of at least some of plurality of members of the at least one group, at least one comment about at least one of the securities corresponding to the plurality of symbols displayed by the display manager, the application comment manager for providing at an output said at least one comment and an identifier of the securities corresponding to the comment; and wherein:

the display manager input is additionally coupled to the application comment manager output for receiving the at least one comment and the identifier of the security corresponding to the at least one comment; and the display manager is additionally for providing at the display manager output for display to each of the plurality of users in the at least one group to which it displays the plurality of symbols, each of the at least of the comment, associated with the symbol about which the comment is directed and a price of the security corresponding to the symbol received at the display manager input.

8. The system of claim 7, wherein each of the rating values in the range assigned to at least one other user received from a user indicates a degree of value the opinions of said other user provide to said user.

9. The system of claim 7, wherein:

the application rating manager additionally provides at the output, and the display manager input is additionally for receiving, an identifier of the user from which each rating value was received; and the rating values to which the order is responsive are influenced at least more heavily by rating values received from the user for which the symbols and comments are being provided for display by display manager than other users from which comments may have been received.

10. The system of claim 7 wherein the at least one group comprises a plurality of groups, and the symbols, prices and comments are displayed by the display manager responsive to each of the groups in the plurality of groups.

11. The system of claim 7, wherein each of the plurality of symbols are displayed by display manager responsive to a number of users in at least one of the at least one group from which the security corresponding to said symbol were received on each said user's list.

12. The system of claim 7, wherein each of the plurality of symbols are displayed by the display manager responsive to a number of users in at least one of the at least one group from which comments about the security corresponding to said symbol were received.

13. A computer program product comprising a computer useable medium having computer readable program code embodied therein for displaying securities information the computer program product comprising computer readable program code devices configured to cause a computer system to:

receive from a first server comprising a social network server a user identifier of each user on the first server in at least one group defined to the first server, each of the at least one group comprising a plurality of users interested in sharing securities information with one another;

receive from each of the plurality of users in each of the at least one group a user identifier of said user at a second server;

for each of at least some of the plurality of users in the at least one group, associate the user identifier of said user on the first server with the user identifier of said user on the second server;

receive from the second server comprising a hardware processor, from each of a plurality of at least some of the plurality of users in the at least one group, a list of securities in which said user is interested;

receive from each of a plurality of the users of the at least one group, at least one rating value from a range of possible rating values of each of at least some of the other users of the at least one group having such user and such other user in common;

provide for display to each of at least some of the plurality of the users in the at least one group, a plurality of symbols corresponding to a plurality of securities from the lists of each of the at least some of the plurality of users of the at least one group that includes such user, responsive to the plurality of lists of securities and the plurality of user identifiers on the first server of the at least one group;

receive from each of at least some of the plurality of the at least one group, at least one comment about at least one of the securities corresponding to the plurality of symbols displayed; and provide for display to each of the plurality of users in the at least one group to which the plurality of symbols are displayed, the at least one comment associated with the symbol of the security about which the at least one comment is directed, and a price of the security corresponding to the symbol; and wherein the symbols are displayed in an order responsive to at least some of each of the at least one rating value given to the plurality of users from whom comments regarding the security corresponding to the symbol were received.

14. The computer program product of claim 13, wherein each of the rating values in the range assigned to at least one other user received from a user indicates a degree of value the opinions of said other user provide to said user.

15. The computer program product of claim 13, wherein the rating values to which the order is responsive are influenced at least more heavily by rating values received from the user for which the symbols and comments are being provided for display than other users from which comments may have been received.

16. The computer program product of claim 13 wherein the at least one group comprises a plurality of groups, and the symbols, prices and comments are displayed responsive to each of the groups in the plurality of groups.

17. The computer program product of claim 13, wherein each of the plurality of symbols are displayed responsive to a number of users in at least one of the at least one group from which the security corresponding to said symbol were received.

18. The computer program product of claim 13, wherein each of the plurality of symbols are displayed responsive to a number of users in at least one of the at least one group from which comments about the security corresponding to said symbol were received on said user's list.

\* \* \* \* \*